US012731360B2

(12) United States Patent
Li et al.

(10) Patent No.: US 12,731,360 B2
(45) Date of Patent: Sep. 8, 2026

(54) METHOD FOR RECOGNIZING AND DIAGNOSING TRANSFORMER EQUIPMENT BASED ON IMAGE FUSION AND TARGET RECOGNITION

(71) Applicant: CHONGQING UNIVERSITY, Chongqing (CN)

(72) Inventors: Yuhuan Li, Chongqing (CN); Zhimin Li, Chongqing (CN); Fan Yang, Chongqing (CN); Zikang Yang, Chongqing (CN); Jinqiao Du, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 322 days.

(21) Appl. No.: 18/700,495

(22) PCT Filed: Jun. 29, 2023

(86) PCT No.: PCT/CN2023/103813
§ 371 (c)(1),
(2) Date: Apr. 11, 2024

(87) PCT Pub. No.: WO2024/183189
PCT Pub. Date: Sep. 12, 2024

(65) Prior Publication Data

US 2025/0232549 A1 Jul. 17, 2025

(30) Foreign Application Priority Data

Mar. 7, 2023 (CN) ......................... 202310210937.0

(51) Int. Cl.
*G06V 10/143* (2022.01)
*G06T 5/10* (2006.01)
(Continued)

(52) U.S. Cl.
CPC .............. *G06V 10/143* (2022.01); *G06T 5/10* (2013.01); *G06T 5/50* (2013.01); *G06T 7/0002* (2013.01);
(Continued)

(58) Field of Classification Search
None
See application file for complete search history.

(56) References Cited

FOREIGN PATENT DOCUMENTS

CN 111612736 A * 9/2020 ........... G06T 7/0004

OTHER PUBLICATIONS

Zhang, Xingchen, Ping Ye, and Gang Xiao. "VIFB: A visible and infrared image fusion benchmark." Proceedings of the IEEE/CVF conference on computer vision and pattern recognition workshops. 2020. (Year: 2020).*

(Continued)

*Primary Examiner* — Matthew C Bella
*Assistant Examiner* — Johnny B Duong
(74) *Attorney, Agent, or Firm* — Hoffmann & Baron, LLP

(57) ABSTRACT

The present disclosure provides a method for recognizing and diagnosing transformer equipment based on image fusion and target recognition, and relates to the technical field of recognizing power equipment. The method includes: performing, through wavelet transform, fusion on an infrared image and a visible light image that corresponds to equipment, and constructing a high-quality library of a fused infrared image and a fused visible light image; and training, based on an SSD target recognition algorithm, with the dataset that uses the library of the fused images as an algorithm, to intelligently recognize the fused image. The target recognition method for the fused images has advantages that infrared light is not affected by light, temperature information is provided, and a resolution of visible light is
(Continued)

clear, so that accurate recognition and diagnosis on transformer equipment are implemented.

4 Claims, 3 Drawing Sheets

(51) Int. Cl.

| | |
|---|---|
| ***G06T 5/50*** | (2006.01) |
| ***G06T 7/00*** | (2017.01) |
| ***G06V 10/52*** | (2022.01) |
| ***G06V 10/77*** | (2022.01) |
| ***G06V 10/774*** | (2022.01) |
| ***G06V 10/82*** | (2022.01) |
| ***G06V 10/98*** | (2022.01) |

(52) U.S. Cl.
CPC .......... *G06V 10/52* (2022.01); *G06V 10/7715* (2022.01); *G06V 10/774* (2022.01); *G06V 10/993* (2022.01); *G06T 2207/10048* (2013.01); *G06T 2207/20016* (2013.01); *G06T 2207/20064* (2013.01); *G06T 2207/20081* (2013.01); *G06T 2207/20084* (2013.01); *G06V 10/82* (2022.01); *G06V 2201/07* (2022.01)

(56) References Cited

OTHER PUBLICATIONS

Shi, Wenyun, and Xiaoming Ren. "Electrical fault detection equipment based on infrared image fusion." Procedia Computer Science 208 (2022): 509-515. (Year: 2022).*

Ma, Weihong, et al. "Infrared and visible image fusion technology and application: A review." Sensors 23.2 (2023): 599. (Year: 2023).*

* cited by examiner

METHOD FOR RECOGNIZING AND DIAGNOSING TRANSFORMER EQUIPMENT BASED ON IMAGE FUSION AND TARGET RECOGNITION

CROSS REFERENCE TO RELATED APPLICATION

This patent application is a national stage application of International Patent Application No. PCT/CN2023/103813, filed on Jun. 29, 2023, which claims the benefit and priority of Chinese Patent Application No. 202310210937.0 filed with the China National Intellectual Property Administration on Mar. 7, 2023, and entitled "METHOD FOR RECOGNIZING AND DIAGNOSING TRANSFORMER EQUIPMENT BASED ON IMAGE FUSION AND TARGET RECOGNITION", the disclosure of which is incorporated by reference herein in its entirety as part of the present application.

TECHNICAL FIELD

The present disclosure relates to the technical field of recognizing power equipment, and in particular to a method for recognizing and diagnosing transformer equipment based on image fusion and target recognition.

BACKGROUND

Intelligent and digital transformation of a power grid is the key to build a novel power system. A conventional method for diagnosing a power fault is difficult to operate and has poor efficiency. With the development of artificial intelligence and infrared thermal imaging technologies, a method for recognizing power equipment in an image based on artificial intelligence technologies has become a trend. The artificial intelligence technologies for recognizing the power equipment have high accuracy and a high speed, so that the power equipment can be monitored and diagnosed in real time.

An infrared image is not affected by light interference and temperature information is provided. However, a resolution of the infrared image is low, which causes interference to the artificial intelligence technology for recognizing the power equipment. A visible light image can well reflect texture information of the image, but is easy to be affected by light conditions. Effect and information provided by images of infrared and visible light wavelengths are much more than information provided by a single infrared image or a signal visible light image.

For two homologous images, namely, an infrared image captured from an infrared thermal imager and a visible light image captured from a camera, a method for diagnosing a fault of power equipment based on image fusion and target recognition, with Application No. CN112733950A, includes: performing image enhancement, to improve contrast, texture details, and brightness of the infrared image, and performing enhancement on the visible light image, to maintain edge information of the visible light image; performing an image alignment method, to resolve a problem that detail information provided by the visible light image and detail information provided by the infrared image are different; performing image fusion, to fuse the infrared image with the visible light image; and performing a target detection method, to complete detection on a defect of power equipment. According to the patent, when the infrared image and the visible light images are processed, a conventional image processing method is combined with a deep learning method. The patent with Application No. CN112733950A has a disadvantage that a recognition speed of an algorithm is slow, which is not conducive to recognizing the power equipment.

SUMMARY

The present disclosure provides a method for recognizing and diagnosing transformer equipment based on image fusion and target recognition, to improve an operation speed of an algorithm and target recognition accuracy.

To achieve the above objective, embodiments of the present disclosure provide the following technical solutions.

A method for recognizing and diagnosing transformer equipment based on image fusion and target recognition includes:

(1), shooting an infrared image and a visible light image of transformer equipment, and performing fusion on the infrared image and the visible light image through discrete wavelet transform, to obtain a fused image;

(2), performing quality screening and equipment labeling on the fused image obtained in step (1), and establishing a library of a fused infrared image and a fused visible light image of the transformer equipment, that is, a dataset of a target recognition algorithm; and (3), training, with the dataset in step (2), a single shot multibox detector (SSD) model using the target recognition algorithm, to implement recognition and diagnosis on the transformer equipment through the fused image.

Optionally, the performing fusion on the infrared image and the visible light image through discrete wavelet transform, to obtain a fused image specifically includes: decomposing the infrared image and the visible light image through discrete wavelet transform, to obtain a high frequency component H and a low frequency component L;

performing column decomposition on decomposed images at a same scale, to obtain high and low frequency cross components in a row direction and a column direction;

performing iterative decomposition on low frequency subbands $LL_n$ in the row direction and the column direction, to obtain a decomposed image subband with a scale of n+1; and performing image reconstruction on each decomposed subband through inverse wavelet transform, performing image fusion through discrete wavelet transform, that is, after the fused image is decomposed, performing fusion on a same subband of different images, and after obtaining a fused subband, performing inverse wavelet transform, to obtain the fused image.

Optionally, the performing quality screening and equipment labeling on the fused image obtained in step (1), and establishing a library of a fused infrared image and a fused visible light image of the transformer equipment, that is, a dataset of a target recognition algorithm specifically includes:

performing quality evaluation on the fused infrared image and the fused visible light image, where an evaluation method is a variance evaluation method; and the fused image is first grayed, a variance operation is performed on a greyscale value of the fused image, a threshold value is set, and a fused image whose variance result is higher than the threshold value is selected; and performing labeling on the fused image, where the labeling is performed through Labelme software, equipment and a suspected fault region of the equipment are labeled; and constructing a high-quality fused image set of the transformer equipment.

Optionally, the training, with the dataset in step (2), an SSD model using the target recognition algorithm specifically includes:

training, with the high-quality fused image set of the transformer equipment, the SSD model using the target recognition algorithm, to recognize the equipment and a heating fault by the SSD model, where the SSD model specifically includes:

a visual geometry group (VGG) backbone layer, used as a base framework to extract an image feature;

an extra feature layer, configured to perform convolution processing on a feature layer generated through VGG, to obtain five feature maps; and a pred-layer, configured to process six feature maps to be predicted, where coordinates of prediction boxes of the six feature maps are finally obtained through the pred-layer; and the pred-layer includes multi-scale detection, non-maximum suppression, confidence, and category information, to implement detection on a target; and prediction on a single-layer feature map is changed into multi-scale prediction through an SSD algorithm, six feature layers are extracted through the SSD algorithm, and sizes of the feature layers are 38*38, 19*19, 10*10, 5*5, 3*3, and 1*1 respectively, namely, six different sizes of feature maps.

Compared with the prior art, the present disclosure has the following advantages and positive effect.

The novelty of the present disclosure lies in: Target detection and diagnosis on a heat fault of the transformer equipment are performed by combining the infrared image with the visible light image. The infrared image can provide temperature information of an object. However, a resolution is low. This affects a recognition rate of the target detection algorithm. A resolution of visible light is high, and can well reflect texture information of the object. A fused image that can reflect temperature information and shows good texture information can be generated by combining the infrared image with the visible light image, which is conducive to improvement of the recognition rate of the target detection algorithm. Basic algorithms in the present disclosure are the SSD algorithm and the wavelet transform algorithm. Because of a fast operation speed, the basic algorithms support real-time recognition on the power equipment.

The fusion algorithm used in the present disclosure is a more complex neural network algorithm. A speed of the fusion algorithm is slower than that of the wavelet transform. In addition, the target recognition algorithm used in the existing patent with Application No. CN112733950A is a faster R-CNN. A speed of the target recognition algorithm is much slower than that of the SSD target detection algorithm used in the present disclosure, and recognition accuracy of the SSD algorithm for the small target is slightly higher than that of the faster R-CNN.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

REFERENCE NUMERALS IN FIG. 3

Figure 1:
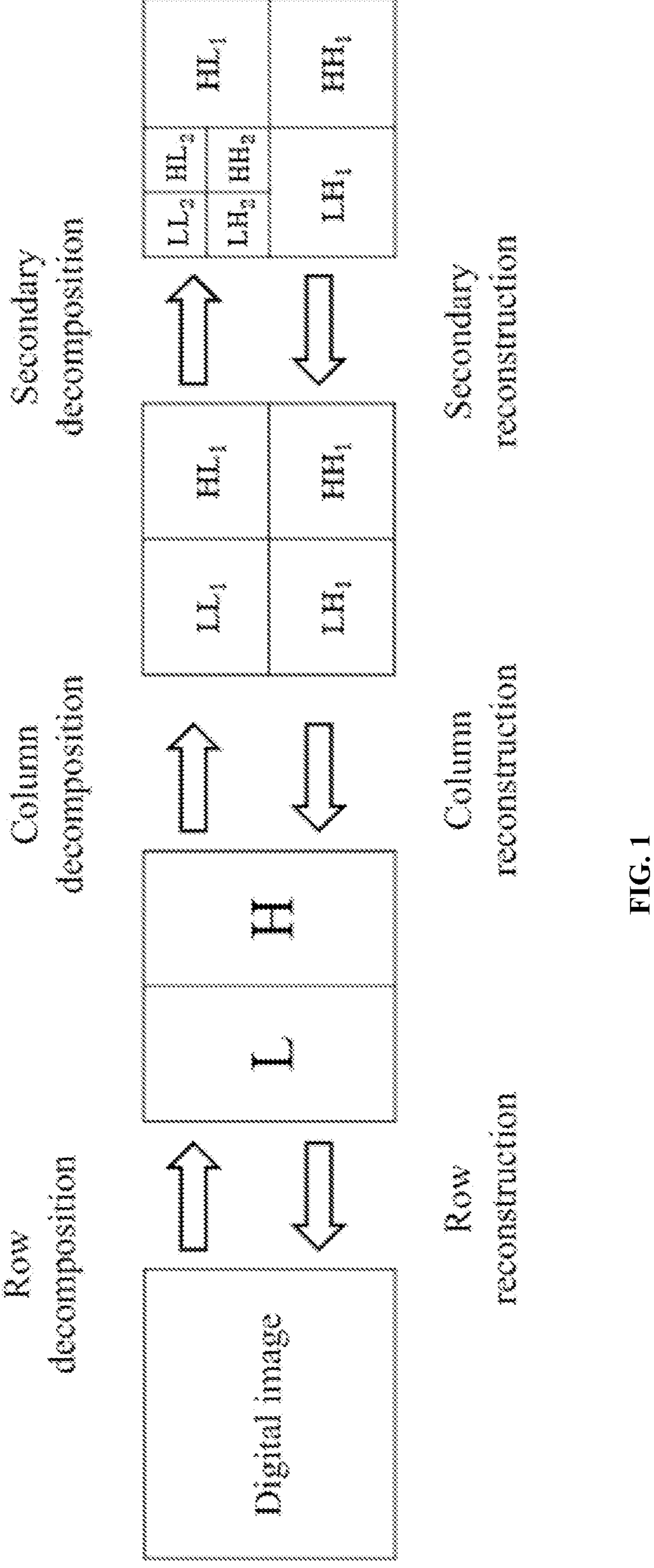
FIG. 1 is a flowchart of performing wavelet transform on an image according to a preferred embodiment of the present disclosure.

101. VGG backbone layer
102. Extra feature layer
103. Prediction layer
104. Image
105. Integration of detection result
106. Non-maximum suppression
107. Output of target box and category

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

As shown in FIG. 1, the present disclosure provides a method for recognizing and diagnosing transformer equipment based on image fusion and target recognition. The method includes the following steps.

(1): Shoot an infrared image and a visible light image of transformer equipment, and perform fusion on the infrared image and the visible light image through discrete wavelet transform.

(2): Perform quality screening and equipment labeling on the fused image obtained in step (1), and establish a library of a fused infrared image and a fused visible light image of the transformer equipment, that is, a dataset of a target recognition algorithm.

(3): Train, with the dataset in step (2), a single shot multibox detector (SSD) model using the target recognition algorithm, to implement recognition and diagnosis on the transformer equipment through the fused image.

Optionally, the performing fusion on the infrared image and the visible light image through discrete wavelet transform includes the following steps.

(1): Decompose the infrared image and the visible light image through discrete wavelet transform, to obtain a high frequency component H and a low frequency component L.

(2): Perform column decomposition on decomposed images at a same scale, to obtain high and low frequency cross components in a row direction and a column direction.

(3): Perform iterative decomposition on low frequency subbands $LL_n$ in the row direction and the column direction, to obtain a decomposed image subband with a scale of n+1. Discrete wavelet transform performed on the image is shown in FIG. 1.

Figure 2:
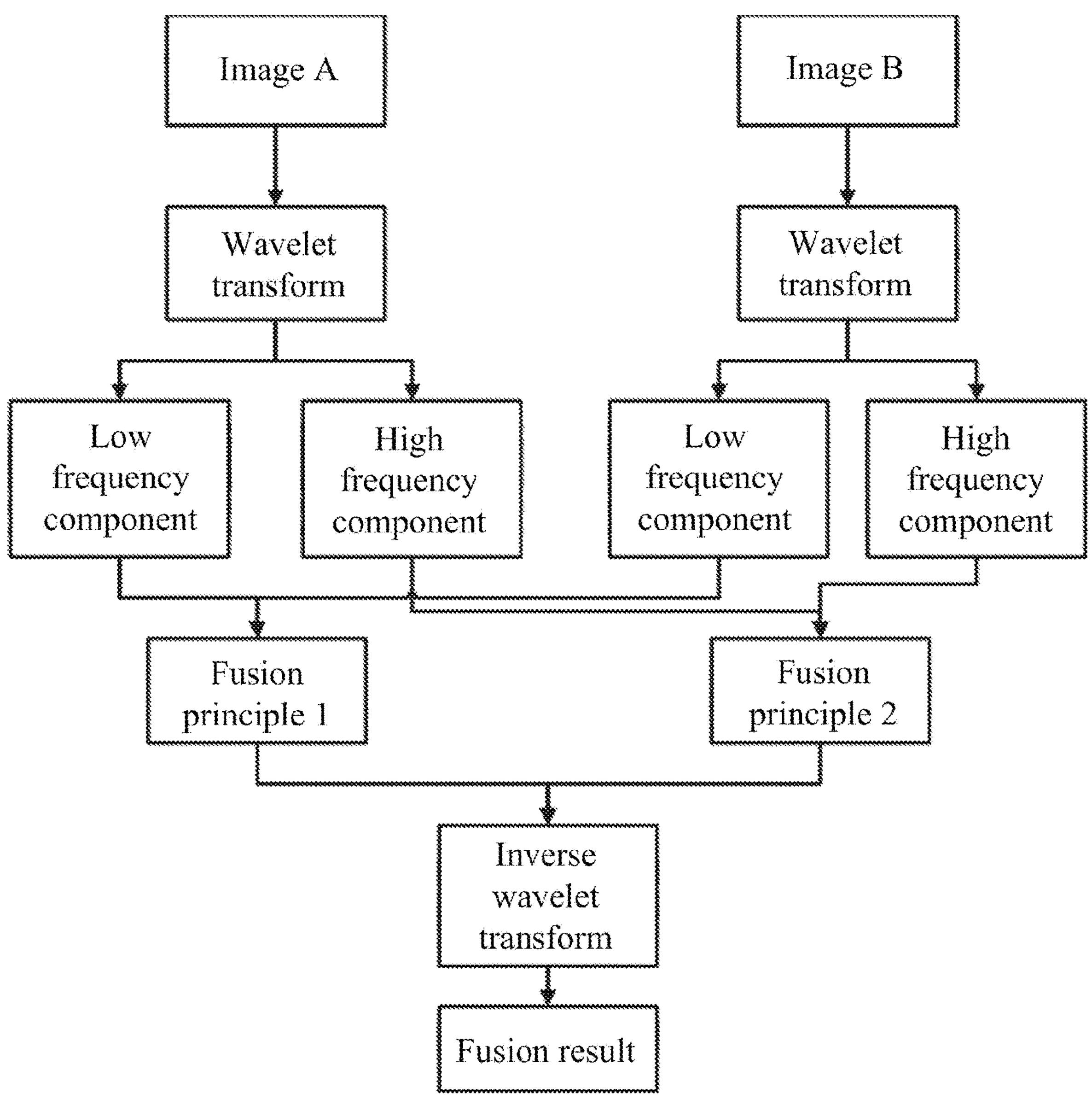
FIG. 2 is a flowchart of fusing on infrared light and visible light through wavelet transform.

(4): Perform image reconstruction on each decomposed subband through inverse wavelet transform, perform image fusion through discrete wavelet transform, that is, after the fused image is decomposed, perform fusion on a same subband of different images, and after obtaining a fused subband, perform inverse wavelet transform, to obtain the fused image. An overall process framework of image fusion through wavelet transform is shown in FIG. 2. For a transformer bushing after image fusion, temperature information of the image can be ensured, and clarity of the image is improved in combination with visible light texture. This is conducive to improvement of recognition accuracy and fault detection of the equipment.

Optionally, the establishing a library of a fused infrared image and a fused visible light image of the transformer equipment specifically includes the following steps:

(1): Perform quality evaluation on the fused infrared image and the fused visible light image. An evaluation method is a variance evaluation method. The fused image is first grayed, and a variance operation is performed on a greyscale value of the fused image. A threshold value is set, and a fused image whose variance result is higher than the threshold value is selected, that is, an image with good quality and more information.

(2): Perform labeling on the fused image selected in step (1), where the labeling is performed through Labelme software, equipment and a suspected fault region of the equipment are labeled; and constructing a high-quality fused image set of the transformer equipment.

Optionally, the step (3) of training the SSD model, to recognize and diagnose a function of the transformer equipment through the fused image includes: training, with the high-quality fused image set of the transformer equipment constructed in step (2), the SSD model using the target recognition algorithm, to recognize the equipment and a heating fault by the SSD model. A basic framework of the SSD model is shown in FIG. 3.

The SSD model specifically includes: a visual geometry group (VGG) backbone layer, an extra feature layer, and a pred-layer.

The VGG backbone layer is used as a base framework to extract an image feature.

Figure 3:
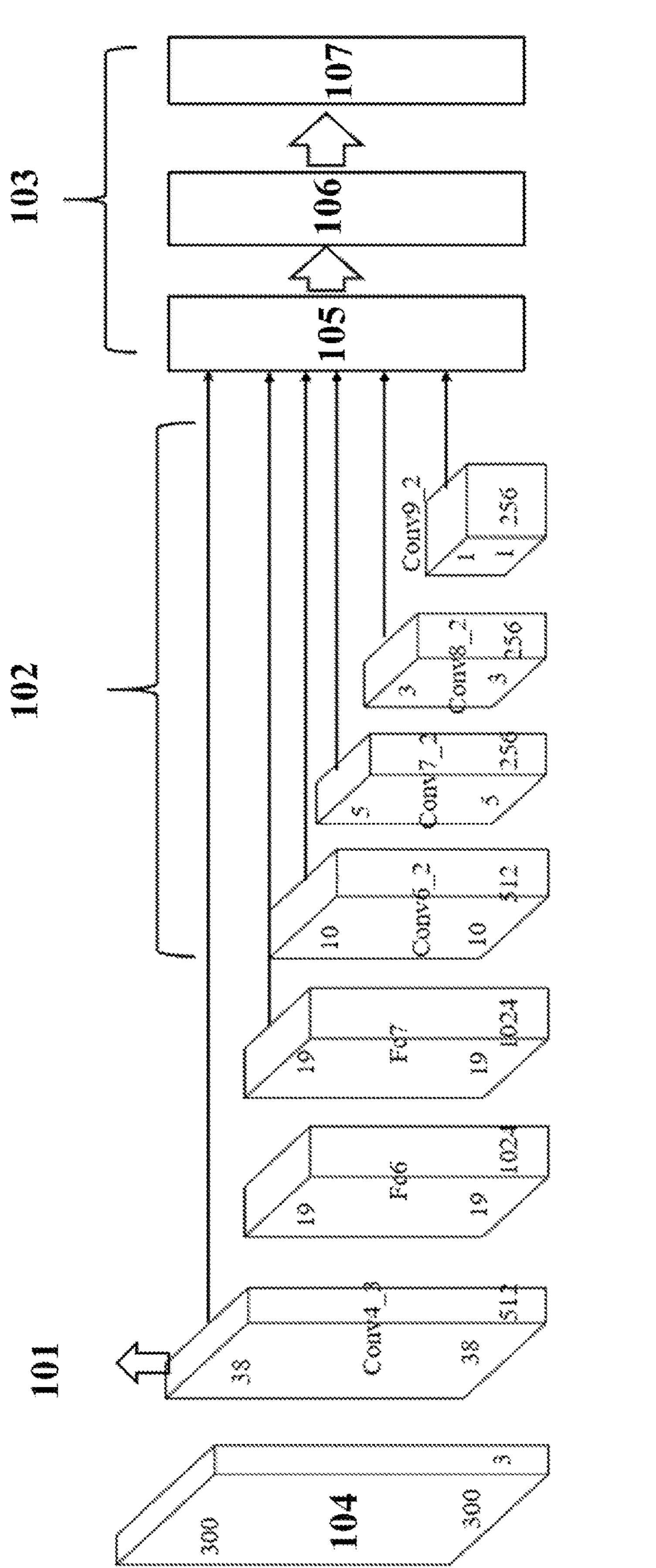
FIG. 3 is a diagram of a basic framework of an SSD model.

The extra feature layer is configured to perform convolution processing on a feature layer generated through VGG, to obtain five feature maps as shown in FIG. 3.

The pred-layer is configured to process six feature maps to be predicted, where coordinates of prediction boxes of the six feature maps are finally obtained through the pred-layer (multi-scale detection and non-maximum suppression, confidence, and category information), to implement detection on a target.

Before an SSD algorithm, a faster RCNN uses only the feature layer of the highest layer. As a result, a small target feature is lost, and small target detection accuracy is low. To resolve the foregoing problem, prediction on a single-layer feature map is changed into multi-scale prediction through the SSD algorithm, six feature layers (conv4-3/conv-7/conv6-2/conv7-2/conv8_2/conv9_2) are extracted through the SSD algorithm, and sizes of the feature layers are 38*38, 19*19, 10*10, 5*5, 3*3, and 1*1 respectively, namely, six different sizes of feature maps. A feature map with a large size retains information about a small target feature, and predicts a small target. A feature map with a small size retains information about a large target feature, and predicts a large target. In the multi-scale prediction method, detection (SSD is dense detection) is more sufficient, and the small target is easier to be detected.

The system, apparatus, modules, and units described in the foregoing embodiments may be specifically implemented by a computer chip or entity, or implemented by product with a specific function. One typical implementation device is the computer. Specifically, the computer may be, for example, a personal computer, a laptop computer, a cellular phone, a camera phone, a smartphone, a personal digital assistant, a media player, a navigation device, an E-mail device, a game console, a tablet computer, a wearable device or a combination thereof.

It should also be noted that the term “comprise”, “include”, or any other variant thereof is intended to encompass a non-exclusive inclusion, such that a process, method, product, or device that includes a series of elements includes not only those elements, but also other elements not explicitly listed, or elements that are inherent to such a process, method, product, or device. Without more restrictions, an element defined by the phrase “including a . . . ” does not exclude the presence of another same element in a process, method, product, or device that includes the element.

Each embodiment in the description is described in a progressive mode, each embodiment focuses on differences from other embodiments, and references can be made to each other for the same and similar parts between embodiments.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A method for recognizing and diagnosing transformer equipment based on image fusion and target recognition, comprising:

(1), shooting an infrared image and a visible light image of transformer equipment, and performing fusion on the infrared image and the visible light image through discrete wavelet transform, to obtain a fused image;

(2), performing quality screening and equipment labeling on the fused image obtained in step (1), and establishing a library of a fused infrared image and a fused visible light image of the transformer equipment, that is, a dataset of a target recognition algorithm; and (3), training, with the dataset in step (2), a single shot multibox detector (SSD) model using the target recognition algorithm, to implement recognition and diagnosis on the transformer equipment through the fused image.

2. The method for recognizing and diagnosing transformer equipment based on image fusion and target recognition according to claim 1, wherein the performing fusion on the infrared image and the visible light image through discrete wavelet transform, to obtain a fused image specifically comprises:

decomposing the infrared image and the visible light image through discrete wavelet transform, to obtain a high frequency component H and a low frequency component L;

performing column decomposition on decomposed images at a same scale, to obtain high and low frequency cross components in a row direction and a column direction;

performing iterative decomposition on low frequency subbands $LL_n$ in the row direction and the column direction, to obtain a decomposed image subband with a scale of n+1; and performing image reconstruction on each decomposed subband through inverse wavelet transform, performing image fusion through discrete wavelet transform, that is, after the fused image is decomposed, performing fusion on a same subband of different images, and after obtaining a fused subband, performing inverse wavelet transform, to obtain the fused image.

3. The method for recognizing and diagnosing transformer equipment based on image fusion and target recognition according to claim 1, wherein the performing quality screening and equipment labeling on the fused image obtained in step (1), and establishing a library of a fused infrared image and a fused visible light image of the transformer equipment, that is, a dataset of a target recognition algorithm specifically comprises:

performing quality evaluation on the fused infrared image and the fused visible light image, wherein an evaluation method is a variance evaluation method; and the fused image is first grayed, a variance operation is performed on a greyscale value of the fused image, a threshold value is set, and a fused image whose variance result is higher than the threshold value is selected; and performing labeling on the fused image, wherein the labeling is performed through Labelme software, equipment and a suspected fault region of the equipment are labeled; and constructing a high-quality fused image set of the transformer equipment.

4. The method for recognizing and diagnosing transformer equipment based on image fusion and target recognition according to claim 3, wherein the training, with the dataset in step (2), a single shot multibox detector (SSD) model using the target recognition algorithm specifically comprises:

training, with the high-quality fused image set of the transformer equipment, the SSD model using the target recognition algorithm, to recognize the equipment and a heating fault by the SSD model, wherein the SSD model specifically comprises:

a visual geometry group (VGG) backbone layer, used as a base framework to extract an image feature;

an extra feature layer, configured to perform convolution processing on a feature layer generated through VGG, to obtain five feature maps; and a pred-layer, configured to process six feature maps to be predicted, wherein coordinates of prediction boxes of the six feature maps are finally obtained through the pred-layer; and the pred-layer comprises multi-scale detection, non-maximum suppression, confidence, and category information, to implement detection on a target; and prediction on a single-layer feature map is changed into multi-scale prediction through an SSD algorithm, six feature layers are extracted through the SSD algorithm, and sizes of the six feature layers are 38*38, 19*19, 10*10, 5*5, 3*3, and 1*1 respectively, namely, six different sizes of feature maps.

* * * * *